Figure 1:
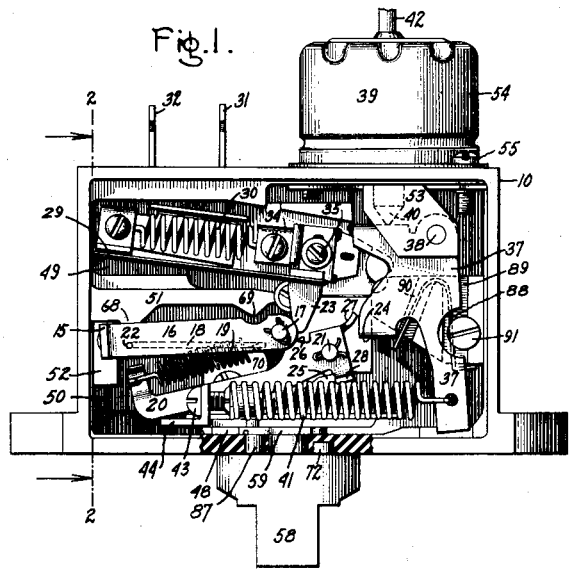

May 17, 1938.  E. ZURCHER  2,117,869
CIRCUIT CONTROLLING DEVICE
Filed April 3, 1936  2 Sheets-Sheet 1

Inventor:
Ernest Zurcher,
by Harry E. Dunham
His Attorney.

May 17, 1938. E. ZURCHER 2,117,869
CIRCUIT CONTROLLING DEVICE
Filed April 3, 1936 2 Sheets-Sheet 2

Inventor:
Ernest Zurcher,
by Harry E. Dunham
His Attorney.

Patented May 17, 1938

2,117,869

UNITED STATES PATENT OFFICE 2,117,869

CIRCUIT CONTROLLING DEVICE

Ernest Zurcher, Schenectady, N. Y., assignor to General Electric Company, a corporation of New York Application April 3, 1936, Serial No. 72,586

15 Claims. (Cl. 200—81)

My invention relates to circuit controlling devices, more particularly to circuit controlling devices for providing combined automatic and manual control of electrical apparatus such, for example, as electric refrigerators, and has for an object the provision of a simple, reliable and inexpensive device of this character.

In a copending application of John Eaton Serial No. 72,553, filed April 3, 1936, entitled "Circuit controlling device", which application is assigned to the same assignee as the present invention, there is described and broadly claimed a combined automatic and manual control device provided with overload responsive means for opening the circuit controlling contacts, and with automatic means for reclosing the contacts after an overload operation. The invention disclosed in the above application was made by the said John Eaton prior to my invention, and I, therefore, do not herein claim anything shown or described in that application, which is to be regarded as prior art with respect to the present invention.

While the device disclosed in the above Eaton application is entirely suitable for carrying out the intended control functions, something is yet to be desired in a compact device of this type which utilizes a minimum number of springs and which is readily adjustable for different operating conditions. Accordingly, it is a further object of my invention to provide a readily adjustable, automatically reclosing control device of this character for electric refrigerators.

In carrying out my invention in one form, I provide a control device provided with relatively movable circuit controlling contacts, with a plurality of independently advanceable and retractable operating members and with operating means for the contacts, including an overcenter spring and a control lever arranged for engagement by the operating members and constantly biased to an initial position by the overcenter spring. Upon advance movement of any one of the operating members, the control lever is moved to carry the spring overcenter so as to operate the contacts with a snap action, and upon retraction of the operating members, the overcenter spring automatically returns the control lever to its initial position and effects return snap movement of the contacts.

More specifically, I provide at least three operating members, one of which is operable in response to overload conditions, the overcenter spring automatically effecting reclosure of the contacts upon retraction of the one operating member after an overload operation. A second one of the operating members is arranged for manual operation to open and close the contacts, and adjustable condition responsive means are provided for operating a third one of the operating members to open and close the contacts at predetermined maximum and minimum conditions. A single control knob is provided for controlling the manually operable member and for adjusting the condition responsive means, and additional means are provided for adjusting the relation of the control knob to the condition responsive means without affecting the relation of the control knob to the manually operable member.

Figure 2:
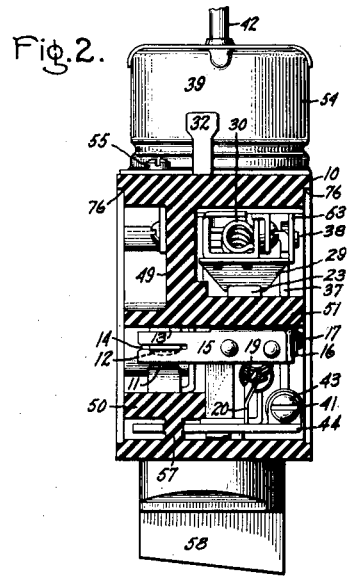
Figure 3:
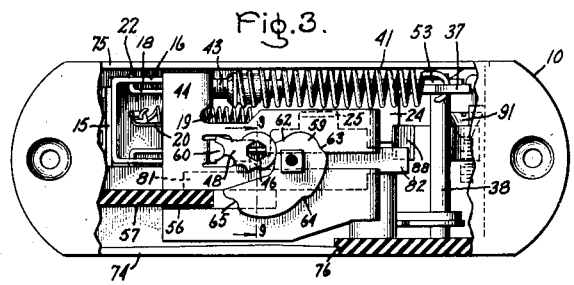
Figures 4, 5:
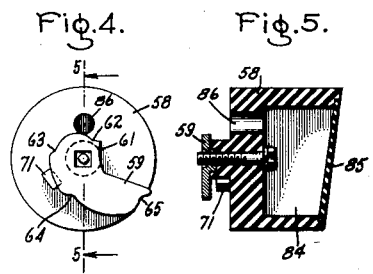
Figure 6:
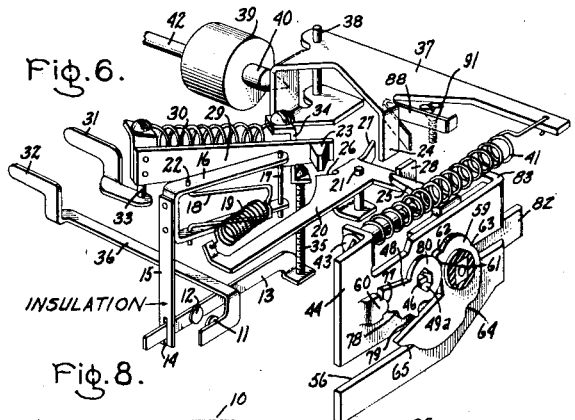
Figure 7:
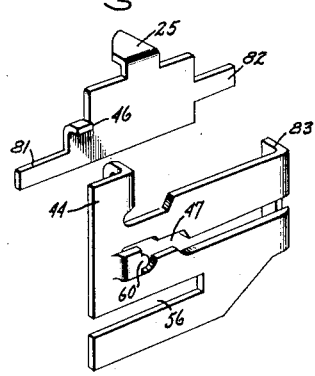
Figure 8:
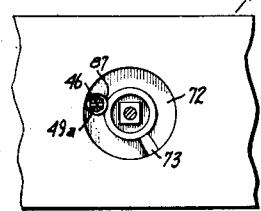
Figure 9:
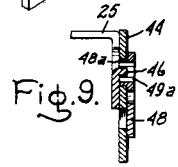

For a more complete understanding of my invention, reference should now be had to the drawings in which Fig. 1 is an elevational view, partly in section, of a control device embodying my invention; Fig. 2 is a sectional end view, taken along the lines 2—2 of Fig. 1; Fig. 3 is a bottom plan view with a portion of the enclosing casing broken away more clearly to illustrate the operating mechanism; Fig. 4 is a detail view of the control knob and the adjusting cam; Fig. 5 is a sectional view, taken along line 5—5 of Fig. 4; Fig. 6 is a skeleton perspective view of the mechanism of the control device shown in Fig. 1; Fig. 7 is a detail view in exploded perspective of a portion of the adjusting mechanism; Fig. 8 is a fragmentary bottom plan view of the control device shown in Fig. 1, with the control knob removed; Fig. 9 is a fragmentary sectional view, taken along the line 9—9 of Fig. 3; and Figs. 10, 11, and 12 respectively are diagrammatic elevational views illustrating the different operating positions of the control device shown in Fig. 1.

Referring now to the drawings, I have shown my invention as embodied in a circuit controlling device comprising a casing 10 formed of molded insulating material for enclosing the circuit controlling means and the automatic and manual operating means. In order more clearly to describe the construction and the arrangement of the various parts, reference will first be had to Fig. 6 in which the various parts are shown independently of the casing 10.

As shown in Fig. 6, my improved control device comprises a stationary contact 11 arranged to be engaged by a movable contact 12 which is supported on a flexible conducting member 13, the extending end of which engages a notch 14 in one end of a finger 15 formed of suitable insulating material. This finger 15, which serves to connect the movable contact to the operating mechanism of the control device is connected at its other end, as shown, to a U-shaped contact operating member 16 pivotally mounted on a pin 17 and connected by means of a U-shaped link 18 and an overcenter spring 19 to a control lever 20 which is pivotally mounted upon a pin 21. As shown, the spring 19 is connected between the free end of the control lever 20 and the closed end of the U-shaped link 18, the open end of which is pivoted at the point 22 in the contact operating member 16. As will be more fully described hereinafter, movement of the control lever 20 about its pivot is effective to carry the spring 19 overcenter relative to the pivot point 22 and thus to effect snap action of the link 18 and the contact operating member 16 to operate the movable contact 12 between open and closed circuit positions.

In order effectively to move the control lever about its pivot, I provide a plurality of advanceable and retractable operating members 23, 24, and 25 normally arranged in spaced relation to the pivoted end of the control lever and arranged upon advance movement thereof to engage suitable abutments 26, 27, and 28 formed on the control lever 20.

The operating member 23 is arranged for operation into abutting engagement with the abutment 26 in response to predetermined overload conditions, the member 23 being supported, as shown, on the free end of a suitable bimetallic element 29 adjacent which is arranged a heater 30. This heater 30 is connected in series circuit relation with the circuit controlling contacts 11 and 12 and with suitable terminal members 31 and 32. The circuit through the control device may thus be traced from the terminal 31 through a conductor 33 to the left-hand terminal of the heater 30 through the heater 30 and by way of conducting members 34 and 35, flexible conductor 13, the contacts 12 and 11, and the conductor 36 to the terminal 32.

The operating member 24 which is arranged abuttingly to engage the abutment 27, extends outwardly from a lever 37, one end of which is pivotally mounted on a pin 38 and suitable condition responsive means are provided for operating the lever 37 about its pivot. This condition responsive means comprises an expansible metallic bellows 39, of the well known type, having an extending portion 40 arranged to engage a portion of the lever 37 to operate the lever 37 about its pivot in a counter-clockwise direction against the bias of an adjustable spring 41 which is connected, as shown, to the other end of the lever 37. As will be well understood by those skilled in the art, the bellows 39 is filled with a suitable expansible medium and is connected by a suitable capillary tube 42 to a temperature responsive bulb (not shown). Thus, the bellows 39 and the spring 41 cooperate to move the pivoted lever 37 about its pivot in one direction or another in accordance with temperature variations of the medium to be controlled and it will be apparent that the temperature setting of the condition responsive means may be adjusted by varying the tension of the spring 41. Accordingly, the opposite end of the spring 41 is connected by an adjustable member or screw 43 to a spring support 44 which is supported for longitudinal movement to adjust the tension of the spring 41 in a manner to be more fully described hereinafter.

As shown in Figs. 6 and 7, the operating member 25 is arranged adjacent the spring support 44 and is provided with an extending finger 46 which projects into a slot 47 formed in the spring support 44. Arranged on the opposite side of the spring support 44 from the operating member 25 is a cam 48 having a hub portion 48a (Fig. 9) which extends into the slot 47 and is provided with an hexagonal aperture 49a into which the finger 46 projects. The operating member 25 thus forms a support for and is supported by the cam 48 on the spring support 44 in a manner to be more fully described hereinafter.

Referring now to Figs. 1 and 2, it will be seen that the casing 10 is provided with a number of integrally formed walls 49, 50, and 51, the walls 49 and 50 dividing the casing into forward and rear compartments and the transversely extending wall 51 dividing the forward compartment into upper and lower recesses. As shown, the overload responsive means, which includes the bimetallic element 29 and the heater 30, is located within the recess immediately above the wall 51, while the operating mechanism including the control lever 20 and the contact operating member 16, is located immediately below the wall 51 with the insulated finger 15 extending through a suitable aperture 52 which is formed in the wall 50, the rearwardly extending end of the finger 15 cooperating with the movable contact 12, the fixed and movable contacts being arranged rearwardly on the wall 50, as shown best in Fig. 2. As shown, the pivot pins 17 and 21 respectively extend outwardly from the dividing wall 50 and a support 53 is provided for the pivot pin 38, the expansible bellows 39 being supported within a suitable casing 54 which is secured to an external wall of the insulating casing 10 by suitable screws 55, the portion 40 extending through the wall of the casing 10 so as to engage the pivoted lever 37.

As shown best in Figs. 1 and 3, the spring support 44 is arranged adjacent the lower wall of the casing 10 and is provided with a slot 56 which cooperates with a guide member 57 (Fig. 3) formed integrally with the casing 10 whereby the spring support 44 is slidably supported for longitudinal movement relative to the wall of the casing 10. Journalled in the lower wall of the casing 10, I provide a control knob 58, the inner end of which supports an operating cam 59, the periphery of which is arranged to engage the periphery of the cam 48 carried by the finger 46 which extends from the operating member 25. The cam 48 is arranged to engage an abutment 60 formed integrally with the spring support 44 and thus constitutes a driving connection between the cam 59 and the spring support 44, as well as a support for the operating member 25.

The cam 59 serves the double purpose of adjusting the bias of the spring 41 and of controlling the position of the operating member 25. As will be apparent upon inspection of Fig. 6, the spring 41 tends to move the spring support 44 and the operating member 25 in a right-hand direction, i. e., toward the abutment 28 and in Fig. 6 the parts are shown in an open circuit position with the operating member 25 engaging the abutment 28. The periphery of the cam 59, however, is provided with a plurality of notches 61 to 65 inclusive arranged at progressively greater radial distances from the center of the cam. Therefore, as the cam 59 is rotated in a clockwise direction, as viewed in Figs. 3 and 6, from the position shown to a position in which the notch 62 engages the cam 48, it will be apparent that the operating member 25 and the spring support 44 will be moved in a left-hand direction and the operating member 25 will, therefore, be retracted to the position shown in Fig. 10, whereupon the circuit controlling contacts will be operated to the closed circuit position in a manner to be more fully described. It is believed that a comprehensive understanding of my invention, as well as a further understanding of the constructional details may now be had from a description of the operation and although my control device is not limited thereto, the operation will be described in connection with the control of an electric refrigerator to which it is particularly applicable.

Figure 10:
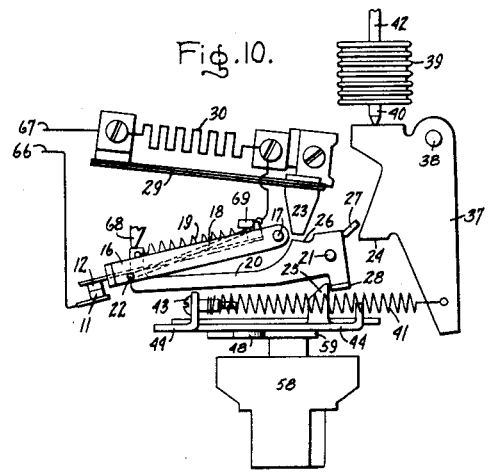

In Fig. 10 the control device is shown somewhat diagrammatically in its normal closed circuit position with all of the operating members 23, 24, and 25 in spaced relation to the control lever 20 and with the movable contact 12 engaging the fixed contact 11 and for the purposes of this description, it will be assumed that the contacts 11 and 12 and the heater 30 are connected in an energizing circuit of an electric refrigerator by means of the conductors 66 and 67. In the position shown here, the spring 19 exerts a force on the control lever 20 tending to rotate the lever in a clockwise direction about its pivot 21, as viewed in the drawings, and a stop 68, engaging the free end of the control lever 20, restrains the lever in the position shown. Likewise, the spring 19 exerts a force on the link 18 tending to rotate the link in a counterclockwise direction about its pivot 22, a suitable stop 69 being provided for engaging the free end of the link 18. As shown in Fig. 1, the stops 68 and 69 are formed integrally with the wall 51.

Since the free end of the link 18 is restrained against counterclockwise movement by the stop 69, the force exerted on the link by the spring 19 will be transmitted to the contact carrying member 16 through the pivots 22 and it will be apparent that this force, tending to move the link longitudinally, tends to rotate the contact operating member 16 in a counterclockwise direction about its pivot 17 whereby a closing bias is exerted on the movable contact 12.

With the control device in the operating position shown in Fig. 10, the energizing circuit for the refrigerator is completed and it will now be assumed that an overload condition occurs of such magnitude that the current flowing through the heater 30 generates sufficient heat to flex the bimetallic element 29. Accordingly, the operating member 23 carried by the bimetallic element 29 will be moved downwardly from the position shown in Fig. 10 to the position shown in Fig. 11 and it will be apparent that as the operating member 23 abuttingly engages abutment 26, the control lever 20 will be rotated in a counterclockwise direction about its pivot against the bias of the spring 19.

Figure 11:
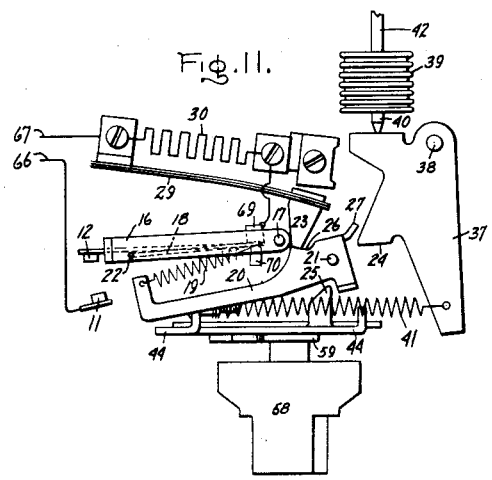
Figure 12:
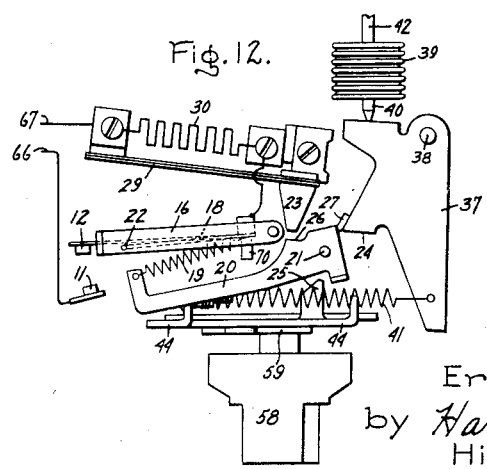

As the free end of the control lever 20 moves downwardly, it will be seen that the spring 19 will be carried overcenter relative to the pivot pin 22 and accordingly the link 18 will be operating with a snap action in a clockwise direction about its pivot to a position shown in Fig. 11, in which position the free end of the link 18 engages a stop 70. Likewise, it will be seen that the free end of the link 18 thus moves overcenter relative to the pivot point 17 of the contact operating member 16 and accordingly the direction of the force exerted on the member 16 through the link 18 will be reversed and the member 16 will be rotated in a clockwise direction about its pivot to the open circuit position shown in Fig. 11.

In order to provide for automatic resetting or reclosing of the control device after an overload operation, the pivot point 21 of the control lever 20 is so arranged relative to the stops 69 and 70, that is, relative to the range of movement of the free end of the link 18, that the spring 19 exerts a clockwise bias on the control lever 20 regardless of the position of the link 18. In other words, the end of the spring 19 which is connected to the link 18, never moves overcenter relative to the pivot point 21 of the control lever 20 and accordingly, the control lever 20 is constantly biased for rotation in a clockwise direction. It will, therefore, be apparent that when the operating member 23 is retracted upon cooling of the bimetallic element 29, the control lever 20 will automatically be rotated in a clockwise direction from the position shown in Fig. 11 to the position shown in Fig. 10 so as to effect reclosure of the circuit controlling contacts with a snap action, the end of the spring 19 connected to the control lever 21 again passing overcenter relative to the pivot point 22.

With the control device in the closed circuit position shown in Fig. 10, in which position the energizing circuit for the refrigerator is completed, it will, of course, be understood that the temperature to which the bellows 39 is responsive will gradually be decreased. Accordingly, the bellows 39 will retract and the pivoted lever 37 will thereupon be rotated in a clockwise direction about its pivot 38 by the spring 41. As the pivoted lever 37 rotates in this clockwise direction from the position shown in Fig. 10 it will be apparent that the operating member 24 will abuttingly engage the abutment 27 of the control lever 20 so as to rotate the control lever in a counter-clockwise direction about its pivot. Accordingly, at a predetermined minimum temperature, the control lever will move the spring 19 overcenter relative to the pivot point 22 and the link 18 and the contact operating member 16 will thereupon be operated with a snap action to the open circuit position shown in Fig. 12. As soon as the energizing circuit for the refrigerator is interrupted, the refrigerator temperature will begin to rise and accordingly the bellows 39 will expand and rotate the lever 37 in a counter-clockwise direction about its pivot against the bias of the spring 41. This counter-clockwise rotation of the lever 37 is effective to retract the operating member 24 and accordingly at a predetermined maximum temperature the control lever 20, which is constantly biased for movement in a clockwise direction as described above, will effect snap operation of the movable contact 12 from the open circuit position shown in Fig. 12 to the closed circuit position shown in Fig. 10.

As indicated above, it is also desirable that means be provided for manually opening and closing the circuit controlling contacts and accordingly the operating member 25 is arranged for operation by the control knob 58 in the manner heretofore described between the open circuit position shown in Fig. 10 and the closed circuit position shown in Figs. 1 and 6. When the control knob is moved to its extreme clockwise position, the cam 48, which is supported on the operating member 25, engages the lowermost notch 61 in the cam 59 and accordingly operating member 25 is moved by the spring 41 to the extreme right-hand position shown in Figs. 1 and 6 abuttingly to engage the abutment 28 and to rotate the control lever 20 to the open circuit position there shown. As hereinbefore described, rotation of the control knob 58 in a counter-clockwise direction so as to bring the notch 62 into engagement with the cam 48, moves the operating member 25 in a left-hand direction to the position shown in Fig. 10 and upon retraction of this operating member 25, the spring 19 automatically rotates the control lever 20 in a counter-clockwise direction to effect circuit closing movement of the contact 12.

As will be well understood by those skilled in the art, the maximum and minimum refrigerator temperatures at which the bellows 39 and the spring 41 effects circuit closing and circuit opening movement respectively may be adjusted by varying the tension of the spring 41. Normally, the tension of the spring 41 is adjusted at the factory by means of the adjustable member 43 which connects one end of the spring 41 to the spring support 44. It is desirable, however, that the user of the refrigerator may adjust these maximum and minimum temperatures to provide different mean average temperatures and, as already indicated, this may be accomplished simply by rotating the control knob 58. Assuming that the control knob is in the position shown in Figs. 10, 11, and 12, in which position the notch 62 engages the cam 48, it will be apparent that the tension of the spring 41 will be relatively small and accordingly the circuit opening and closing movement will be effected at relatively low temperatures. If it is desired to raise these temperature limits, the control knob may be rotated in a counter-clockwise direction to a position in which the notch 63 engages the cam 48 and during this movement of the control knob, it will be apparent that the spring support 44 will be moved in a left-hand direction, as viewed in Fig. 6, to increase the tension of the spring 41. Further movement of the control knob in a counter-clockwise direction will, of course, result in further movement of the spring support in a left-hand direction and the consequent increase in the tension of the spring 41, whereupon the maximum and minimum temperature limits at which circuit opening and circuit closing movement is initiated will be raised.

During normal operation of a household refrigerator, frost accumulates on the cooling unit, as is well understood by those skilled in the art, and accordingly it is desirable to provide means for defrosting the cooling unit of the refrigerator. For this purpose, the cam 59 is provided with the notch 65 having a relatively great radial distance from the center of the cam and it will, therefore, be apparent that when the control knob 58 is rotated to its extreme counter-clockwise position, so that the notch 65 engages the cam 48, the spring 41 will be greatly stressed and accordingly, both the maximum and minimum temperature conditions at which circuit closing and circuit opening movement is initiated will be raised considerably. Preferably, the radial distance of this notch 65 is so adjusted that circuit closing movement of the contact 12 is initiated at a refrigerator temperature considerably above 32° F., while circuit opening movement of the contact 12 is initiated at a temperature somewhat below 32° F. Thus, the defrosting of the cooling unit may be accomplished while still maintaining a refrigerating temperature in the refrigerator.

In order positively to limit the rotation of the control knob 58 between the extreme clockwise position shown in Fig. 6 and the extreme counter-clockwise position in which the notch 65 engages the cam 48, the control knob is provided with an extending stop member 71 which extends into an annular groove 72 (Fig. 8) formed in the lower wall of the casing 10. As shown in Fig. 8, this annular groove is provided with a bridge 73, the opposite sides of which are engaged by the stop member 71 when the control knob 58 is in its extreme positions.

In accordance with the usual practice, the maximum and minimum temperature settings obtainable by manipulation of the control knob 58 are adjusted at the factory by manipulating the adjustable member 43 so as to vary the tension of the spring 41. The control device is then sealed up by securing suitable cover plates 74 and 75 in the notches 76 formed in the casing 10.

After the control device has been installed, further adjustment of the spring 41 may be necessary to compensate for different climatic or ambient conditions and it is usually desirable that this further adjustment be accomplished without destroying the initial factory setting. Accordingly, my improved control device includes means for accomplishing such further adjustment without destroying the factory setting and without affecting the on and off relation of the control knob 58 to the operating member 25.

It will be remembered that the sole driving connection between the cam 59 and the spring support 44 comprises the cam 48 which engages the abutment 60 on the spring support. This cam 48 is provided with a plurality of notches 77, 78, and 79 arranged at different radial distances from the center of the cam and with a peripheral portion 80 of uniform radius. Accordingly, it will be apparent that rotation of the cam 48 about the supporting finger 46 so as to engage a selected one of the notches 77, 78, and 79 with the abutment 60 is effective to adjust the relation of the spring support 44 to the cam 59 without affecting the relation of the operating member 25 to the cam 59. The operating member 25 is guided for longitudinal movement relative to the spring support 44 by a portion 81 which engages the guide member 57 (Fig. 3) and by a portion 82 which extends into an enlarged extension of the slot 47, which extension is formed in a laterally extending portion 83 of the spring support 44.

Ordinarily, the control device is adjusted at the factory with the notch 78 engaging the abutment 60 and if it is found, after installation of the control device, that a proper range of refrigerator temperatures can not be obtained by manipulation of the control knob 58, the temperature setting of the control device may be raised by rotating the cam 48 to the position shown, in which position the notch 77 engages the abutment 60. It will be apparent that rotation of the cam 48 to this position moves the spring support 44 in a left-hand direction to increase the tension on the spring 41 without affecting the relation of the control knob 58 to the operating member 25. Likewise, the temperature range may be lowered by rotating the cam 48 to a position in which the notch 79 engages the abutment 60.

In order that this additional adjustment of the temperature setting may be accomplished by a service man, without dismantling the control device, the control knob 58, which is provided with a hollow portion 84 and a cover plate 85, is formed with an aperture 86 therein (Figs. 4 and 5). This aperture 86 is alignable upon rotation of the control knob 58 with a similar aperture 87 formed in a wall of the casing 10 in alignment with the hexagonal aperture in the cam 48. Thus, it will be seen that when the control knob is rotated to a selected position so as to bring the apertures 86 and 87 into alignment and the cover plate 85 is removed, a suitable instrument, such as a screw-driver or a tool having a hexagonal head, may be inserted through the apertures into engagement with the hexagonal aperture 49a in the cam 48, whereupon the cam 48 may be rotated to adjust the position of the spring support 44. As shown best in Fig. 9 the extending finger 46 extends only part way through the hub of the cam 48 so as to leave room for the insertion of the above referred to operating tool.

It will, of course, be understood by those skilled in the art that adjustment of the spring 41 affects both the minimum and the maximum temperatures at which the control device will be respectively closed and opened. In some cases it may be desirable to vary one or the other of these temperatures so as to change the differential between the opening and closing temperatures. Accordingly, I provide further adjustment means comprising a U-shaped leaf spring 88 (Fig. 1) arranged in suitable notches 89 and 90 formed in the casing 10 with one end of the spring disposed so as to engage the operating member 24 and the other end of the spring engaged by an adjusting screw 91 having a conical or tapered head, as shown best in Fig. 6. When the pivoted lever 37 and the operating member 24 carried thereby are in the position shown in Figs. 1 and 6, it will be seen that the spring 88 assists the spring 41. It will be apparent, however, that when the lever 37 moves in a counter-clockwise direction so as to engage the abutment 27, the free end of the spring 88 will engage the side of the notch 90 and thereafter the movement of the lever 37 will be unaffected by the spring 88. Accordingly, the temperature limit at which the movable contact is operated to its open circuit position will be unaffected by the differential spring 88. As the pivoted lever 37 moves in a counter-clockwise direction, however, from the position shown in Fig. 12, it will be apparent that the operating member 24 will engage the end of the spring 88 before the spring 19 has been moved overcenter relative to the pivot point 22. Further movement of the lever 37 in a counter-clockwise direction will be opposed by the spring 88, as well as the spring 41, and accordingly, the temperature limit at which closing operation of the movable contact 12 takes place will be determined by the combined force of the springs 41 and 88. Adjustment of the differential spring 88 to raise or lower the maximum temperature at which the closing operation occurs may be accomplished simply by adjusting the screw 91, the tapered head of which engages the other end of the spring.

While I have shown a particular embodiment of my invention, it will be understood of course that I do not wish to be limited thereto since many modifications may be made and I therefore contemplate by the appended claims to cover any such modifications as fall within the true spirit and scope of my invention.

What I claim as new and desire to secure by Letters Patent of the United States, is:

1. A circuit controlling device comprising movable circuit controlling means, a plurality of independently advanceable and retractable operating members, and operating means including a single overcenter spring continuously biasing said operating means to a single predetermined initial position for moving said circuit controlling means from one circuit controlling position to another with a snap action in response to advance movement of any of said operating members, and for automatically returning said circuit controlling means to said one circuit controlling position with a snap action in accordance with the bias of said spring upon retraction of said operating members.

2. A circuit controlling device for an electric refrigerator comprising relatively movable contacts, a plurality of independently advanceable and retractable operating members, and operating means including an overcenter spring continuously biasing said operating means to a closed circuit position for moving one of said contacts to open circuit position with a snap action in response to advance movement of any one of said operating members and for automatically returning said one contact to closed circuit position with a snap action in accordance with the bias of said overcenter spring upon retraction of said operating members.

3. A circuit controlling device comprising circuit controlling means movable between open and closed circuit positions, a pivoted control lever biased for movement to a predetermined position, a plurality of abutment members extending outwardly from said control lever adjacent the pivot point thereof, a plurality of operating members arranged about said pivot point in respective spaced relation with said abutment members, independent means for respectively moving each of said operating members into engagement with one of said abutment members to operate said control lever from said biased position to a second position, said control lever automatically returning to said predetermined biased position in accordance with its bias upon retraction of said operating members, and means responsive to movement of said control lever between said biased and said second positions for operating said circuit controlling means between open and closed circuit positions with a snap action.

4. A circuit controlling device comprising relatively movable contacts, means including an overcenter spring movable between critical positions for operating said contacts between open and closed circuit positions with a snap action, a pivoted control lever for moving said overcenter spring between said critical positions, said spring being connected to said control lever and arranged to bias said lever to a predetermined position when said spring is in either of said critical positions, and a plurality of movable operating members normally arranged in spaced relation to said control lever, each of said members being independently movable from said normal positions to engage said control lever and operate said lever about its pivot to effect snap movement of said contacts by said overcenter spring, said spring automatically returning said control lever to said predetermined biased position to effect return snap movement of said contacts upon return of said operating members to said normal positions.

5. A circuit controlling device comprising relatively movable contacts, means including an overcenter spring movable between critical positions for operating said contacts between open and closed circuit positions with a snap action, a pivoted control lever for moving said overcenter spring between said critical positions, said spring being connected to said control lever and arranged to bias said lever to a predetermined position when said spring is in either of said critical positions, at least three independently advanceable and retractable operating members normally positioned in spaced relation to said control lever, each of said operating members upon advancement engaging said control lever to move said lever from said biased position and effect snap movement of said contacts, said spring automatically returning said lever to said biased position to effect return snap movement of said contacts upon retraction of said operating members.

6. A circuit controlling device comprising relatively movable contacts, means including an overcenter spring movable between critical positions for operating said contacts between open and closed circuit positions with a snap action, a pivoted control lever for moving said overcenter spring between said critical positions, said spring in either of said critical positions biasing said control lever to a predetermined position, said lever when in said predetermined position maintaining said spring in one of said critical positions to bias said contacts to said closed circuit position, a plurality of independently movable operating members adjacent said control lever, and thermal means heated in accordance with the current in the circuit for moving one of said operating members to actuate said control lever from said predetermined position whereby snap movement of said contacts to said open circuit position is effected in response to predetermined current conditions in said circuit, said spring automatically effecting return movement of said control lever to said predetermined position and snap movement of said contacts to said closed circuit position upon cooling of said thermal means and retraction of said one operating member.

7. A circuit controlling device comprising relatively movable contacts, a pivotally mounted member for operating said contacts between open and closed circuit positions, a link pivotally mounted on said member, spaced apart stop means providing a limited range of movement for said link, a spring connected to the free end of said link and movable with respect thereto for operating said link in one direction or another between said stop means, said spring applying to said member through said link an operating force dependent upon the position of said link relative to said stop means, a pivotally mounted control lever having its free end connected to said spring and its pivot so related to said range of movement of said link that said spring constantly biases said lever to an initial position, and means for moving said control lever about its pivot to move said spring and effect snap movement of said contact operating member, said spring upon release of said lever effecting return movement thereof to said initial position and return snap movement of said contact operating member.

8. A circuit controlling device comprising relatively movable contacts, a pivotally mounted member for operating said contacts between open and closed circuit positions, a link pivotally mounted on said member, spaced apart stop means providing a limited range of movement for said link, a spring connected to the free end of said link and movable with respect thereto for operating said link in one direction or another between said stop means, said spring applying to said member through said link an operating force dependent upon the position of said link relative to said stop means, a pivotally mounted control lever having its free end connected to said spring and its pivot so related to said range of movement of said link that said spring constantly biases said lever to an initial position, a plurality of independent operating members arranged in spaced relation to said control lever and movable into abutting engagement therewith for operating said control lever about its pivot to move said spring and effect snap movement of said contact operating member, said spring upon retraction of said operating members effecting return movement of said control lever to said initial position and return snap movement of said contact operating member.

9. A circuit controlling device comprising movable circuit controlling means normally biased to closed circuit position, a plurality of independently movable members for operating said circuit controlling means to an open circuit position, condition responsive means for moving one of said operating members to effect opening and closing movement of said circuit controlling means at predetermined maximum and minimum conditions said condition responsive means including a spring for applying a bias to said one operating member, a support for said spring, adjustable means for mounting a second one of said operating members for movement with said spring support, and manual means for effecting movement of said spring support to adjust said spring and thereby vary the maximum and minimum conditions at which said condition responsive means effects operation of said circuit controlling means, said second operating member being arranged to effect opening movement of said circuit controlling means upon movement of said spring support to one extreme position.

10. A circuit controlling device comprising movable circuit controlling means normally biased to closed circuit position, a plurality of independently movable members for operating said circuit controlling means to open circuit position, temperature responsive means including a biasing spring for effecting circuit opening and circuit closing movement of one of said operating members at predetermined maximum and minimum temperatures a support for said spring adjustable means for mounting a second one of said operating members on said spring support, and manual means for moving said spring support to adjust the bias of said spring and thereby vary the maximum and minimum temperatures at which said temperature responsive means effects operation of said circuit controlling means, said second operating member being arranged to effect independent opening movement of said circuit controlling means upon movement of said spring support to one extreme position.

11. A circuit controlling device comprising movable circuit controlling means normally biased to closed circuit position, a plurality of independently movable members for operating said circuit controlling means to open circuit position, temperature responsive means including a biasing spring for effecting circuit opening and circuit closing movement of one of said operating members at predetermined maximum and minimum temperatures, a support for said spring, means mounting a second one of said operating members adjacent said spring support, common manual means for moving said second operating member to effect circuit opening and circuit closing movement of said circuit controlling means and for moving said spring support to adjust the bias of said spring and thereby vary the maximum and minimum temperatures at which said one operating member effects circuit opening and circuit closing movement of said circuit controlling means, and auxiliary manual means for moving said spring support independent of said second operating member and said common manual means to adjust the maximum and minimum temperatures obtainable upon operation of said common manual means without affecting the relation of said second operating member to said common manual means.

12. A circuit controlling device comprising movable circuit controlling means, temperature responsive means including an operating member for effecting opening and closing movement of said circuit controlling means at predetermined maximum and minimum temperature limits, said temperature responsive means including a spring for biasing said operating member, a slidably movable spring support for adjusting said spring to vary the maximum and minimum temperatures at which said temperature responsive means effects closing and opening movement of said circuit controlling means, said spring support having a longitudinal slot therein, a second operating member movable independently of said temperature responsive means to effect opening and closing movement of said circuit controlling means and provided with a finger extending through said slot, a cam supported on said finger, abutment means on said spring support engaging said cam, means for moving said cam longitudinally to move said spring support and said second operating member simultaneously, and means for rotating said cam on said finger to move said spring support relative to said second operating member.

13. A circuit controlling device comprising movable circuit controlling means, temperature responsive means including an operating member for effecting opening and closing movement of said circuit controlling means at predetermined maximum and minimum temperature limits, said temperature responsive means including a spring for biasing said operating member, a slidably movable spring support for adjusting said spring to vary the maximum and minimum temperatures at which said temperature responsive means effects opening and closing movement of said circuit controlling means, said spring support having a longitudinal slot therein, a second operating member movable independently of said temperature responsive means to effect opening and closing movement of said circuit controlling means and provided with a finger extending through said slot, a cam supported on said finger, abutment means on said spring support engaging said cam, a second cam engaging the periphery of said first mentioned cam, means for rotating said second cam to move said second operating means and said spring support simultaneously, and means for rotating said first cam to move said spring support relative to said second operating member.

14. A circuit controlling device comprising an enclosing casing having an aperture in one wall, a control knob rotatably supported on said one wall adjacent said aperture, said knob normally closing said aperture and having a similar aperture therein alignable with said aperture in said wall when said knob is rotated to a selected position, control means within said casing adjustable by rotation of said knob, and auxiliary adjusting means within said casing adjacent said aperture in said wall for adjusting the relation between said control knob and said control means, said auxiliary adjusting means being accessible through said apertures for external manipulation when said knob occupies said selected position.

15. A circuit controlling device comprising an enclosing casing having an aperture in one wall, a control knob rotatably supported on said wall adjacent said aperture, said knob normally closing said aperture and having a similar aperture therein alignable with said aperture in said wall when said knob is rotated to a selected position, control means within said casing including a slidable adjusting member movable along said wall in accordance with the rotation of said knob, cam means carried by said adjusting member for varying the relation between said member and said knob, said cam means upon rotation of said knob to said selected position being alignable with said apertures whereby said cam means is accessible for external manipulation.

ERNEST ZURCHER.